(12) United States Patent
Chu

(10) Patent No.: US 12,492,780 B1
(45) Date of Patent: Dec. 9, 2025

(54) MONITOR STAND BASE STRUCTURE

(71) Applicant: Eastern Global Corporation, New Taipei (TW)

(72) Inventor: Leo Chu, New Taipei (TW)

(73) Assignee: Eastern Global Corporation, New Taipei (TW)

( * ) Notice: Subject to any disclaimer, the term of this patent is extended or adjusted under 35 U.S.C. 154(b) by 0 days.

(21) Appl. No.: 18/808,424

(22) Filed: Aug. 19, 2024

(51) Int. Cl.
  *F16M 13/02* (2006.01)

(52) U.S. Cl.
  CPC ....... *F16M 13/022* (2013.01); *F16M 2200/08* (2013.01)

(58) Field of Classification Search
  CPC .......................... F16M 13/022; F16M 2200/08
  See application file for complete search history.

(56) References Cited

U.S. PATENT DOCUMENTS

| | | | | |
|---|---|---|---|---|
| 9,706,843 B2* | 7/2017 | Hung | | F16M 11/24 |
| 10,323,791 B1* | 6/2019 | Liu | | F16B 2/065 |
| 10,610,010 B2* | 4/2020 | Matlin | | F16M 11/2014 |
| 11,131,332 B2* | 9/2021 | Huang | | F16B 2/065 |
| 11,543,073 B2* | 1/2023 | You | | F16M 11/2064 |
| 2010/0327129 A1* | 12/2010 | Chen | | F16M 11/24 248/121 |
| 2012/0267497 A1* | 10/2012 | Bowman | | F16M 13/022 248/280.11 |
| 2019/0301670 A1* | 10/2019 | Glickstein | | F16M 11/16 |

* cited by examiner

*Primary Examiner* — Monica E Millner
(74) *Attorney, Agent, or Firm* — Demian K Jackson; Jackson IPG PLLC

(57) ABSTRACT

A monitor stand base structure includes three main components: base body, first clip and second clip. When you want to clip it on the desktop, just pass the screw thread of the locking element through the positioning holes at the required height according to the thickness of the desktop, and then connect and fix it with the connecting screw holes of the second clip. Then, tighten the screw thread of another locking element to the fixing screw hole of the first fixed wall of the first clip to connect and fix it. The installation can be completed quickly and conveniently. This invention has the practicality of stable structure, simple construction, light weight, small space, convenient operation and low cost.

2 Claims, 9 Drawing Sheets

MONITOR STAND BASE STRUCTURE

BACKGROUND AND SUMMARY OF THE INVENTION

The present invention relates to a related technical field of a monitor stand base structure that is light, space-saving, easy to operate, structurally stable, and cost-effective.

In order to consider the base of the monitor stand to be suitable for clamping on tables of different thicknesses, or to consider the connection method with the lower support arm of the monitor stand, etc., it generally has the disadvantages of being large in size, taking up space, having poor structural stability, being inconvenient to operate, and having high costs. For example, the monitor stand base disclosed in US Publication No. US2022/0290802 has the above-mentioned defects. Please refer to the monitor stand base 8 shown in FIG. 1. When the user wants to clamp the base 8 on the desktop, he must bend down and lock it under the desktop. When the user wants to change the position of the base 8 on the desktop, he must bend down to disassemble it under the desktop. Therefore, there is a further disadvantage that the installation and disassembly are more troublesome.

After checking, the same inventor of this application has Taiwan utility model No. M599931 "Base Clamp Structure of Screen Bracket". When installing or removing the device, you do not need to bend down to operate it under the table, which is very practical. However, it is still not perfect. It is assembled by a first fixing frame, a second fixing frame, two clamps, two elastic pads, a base, a bushing, two stop screws, four second locking elements, two third locking elements, two fourth locking elements, a fifth locking element, a decorative cover and two screw covers. Not only does it have many components and complicated assembly, the structural stability needs to be improved, and the operation is not fast and convenient.

Reviewing the same inventor's Taiwan utility model No. M464718 "Monitor Stand Clamp", it is practical because when the base is to be installed on the desktop or removed, there is no need to bend down to operate under the desktop, which is very practical. However, there are still some shortcomings such as poor structural stability, large size and inconvenient operation.

Reviewing Taiwan utility model No. M563572 "Cantilever fixture for supporting a screen". Although the above patents disclose that the installation operation can be performed directly on the desktop, it also has the disadvantages of being unstable in structure, occupying space, and being inconvenient to assemble.

SUMMARY OF THE INVENTION

In view of this, the inventor of the present invention finally created and designed this monitor stand base structure after continuous research, improvement and testing.

Therefore, the main object of the present invention is to provide a monitor stand base structure that can achieve the purpose of convenient operation.

Another object of the present invention is to provide a monitor stand base structure that is lightweight and does not take up space.

Still another object of the present invention is to provide a monitor stand base structure, which has a structurally stable effect.

Still another object of the present invention is to provide a monitor stand base structure, which has the advantages of simplified components and relatively lower costs.

Still another object of the present invention is to provide a monitor stand base structure, which can be installed on a desktop or disassembled by simply operating on the desktop.

DETAILED DESCRIPTION OF THE INVENTION

Figure 9:
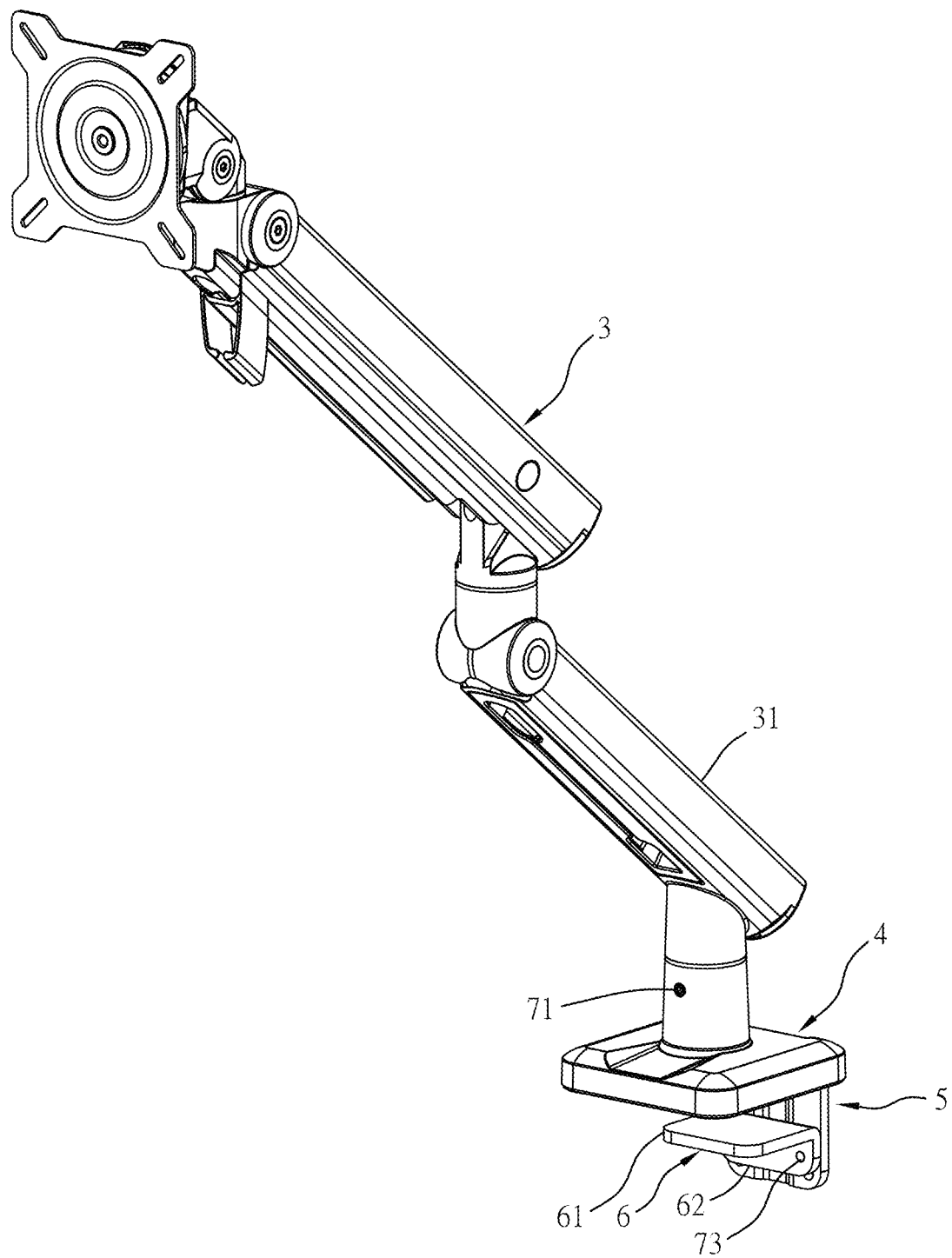
FIG. 9 is a three-dimensional schematic diagram of the present invention after being connected to a monitor bracket.

As shown in FIGS. 2 to 8, the present invention provides a monitor stand base structure, which is used to be clamped on a desktop 2 (see also FIG. 8), and the upper portion thereof is used to connect a monitor bracket 3 (see also FIG. 9). The monitor stand base structure comprises:
  a base body 4 comprising a setting groove 41 (refer to FIG. 2) on the upper side, a sleeve 42 provided in the setting groove 41 and sleeved with the lower side (not shown) of a lower arm 31 (refer to FIG. 9) of the monitor bracket 3 through the sleeve 42, so that the lower arm 31 of the monitor bracket 3 is connected to the base body 4 through a first locking element 71;
  a first clip 5 connected to the base body 4 through a second locking element 72; and
  a second clip 6 connected to the first clip 5 through two third locking elements 73.

The main features of the present invention are as follows:
The first clip 5 comprises a first fixed wall 51, a first side wall 52 connected to the lower side of the end edge of one side of the first fixed wall 51, a fixing screw hole 511 located on an opposite side of the first fixed wall 51, two rows of positioning grooves 53 located on the first side wall 52 (see also FIG. 5), and a plurality of positioning holes 531 of different heights located in each positioning groove 53 (see also FIG. 5).

The second clip 6 comprises a second fixed wall 61, a second side wall 62 connected to the lower side of the end edge of one side of the second fixed wall 61, and two connecting screw holes 621 provided on the second side wall 62 at intervals. The screw threads of the two third locking elements 73 are respectively passed through two positioning holes 531 at the same height of the first side wall 52 of the first clip 5 and then respectively connected with the two connecting screw holes 621 of the second clip 6, so that the second clip 6 is connected and fixed at the required height position of the first clip 5 (refer to FIG. 5).

The base body 4 further comprises a receiving groove 43 provided at the bottom thereof (see FIG. 3, FIGS. 7-8), an upper abutment wall 44 (see FIGS. 6-8), a front limiting wall 45 (see FIGS. 2-3, FIG. 6) and a rear limiting wall 46 (see FIGS. 2-3 and FIG. 6) located on an upper part of the receiving groove 43, a positioning column 49 (see FIG. 7) located therein and provided with a longitudinal through hole 491 (see FIG. 7) for the threaded portion of the second locking element 72 to pass through so that a gasket 70 is then passed through the threaded portion of the second locking element 72 and then locked with the fixing screw hole 511 of the first fixed wall 51 of the first clip 5 to be connected and fixed, allowing an upper end surface 512 (see FIGS. 6 to 8) of the first fixed wall 51 of the first clip 5 to abut against the upper abutting wall 44 (see FIGS. 6 to 8) of the receiving groove 43 and also allowing a front wall surface 513 (refer to FIG. 6) and a rear wall surface 514 (refer to FIG. 6) of the first fixed wall 51 of the first clip 5 to respectively abut against the front limiting wall 45 and the rear limiting wall 46 in the receiving groove 43, to further stably connect the base body 4 to the first clip 5 without taking up space.

Figure 5:
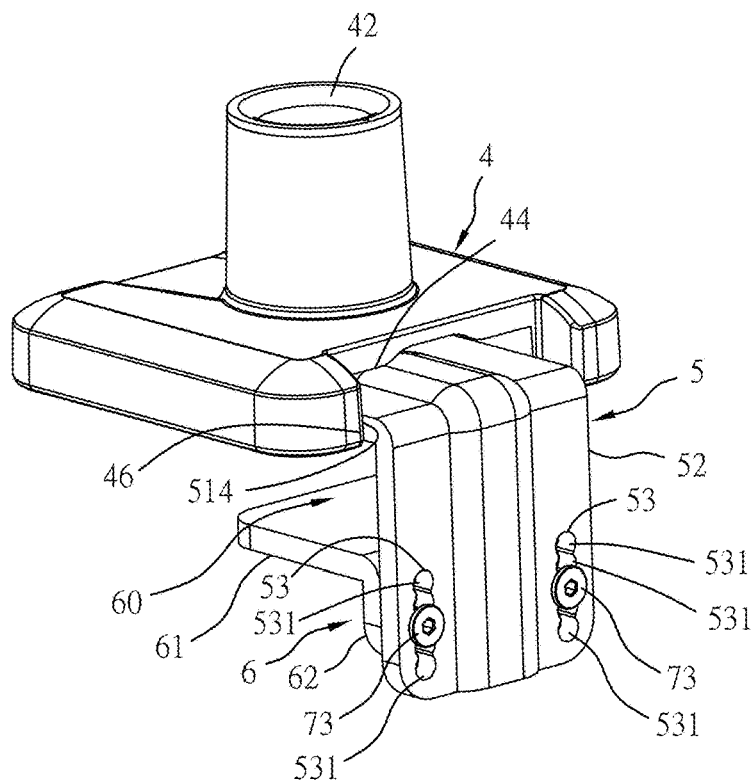
FIG. 5 is a three-dimensional diagram of the present invention from another angle.
Figure 6:
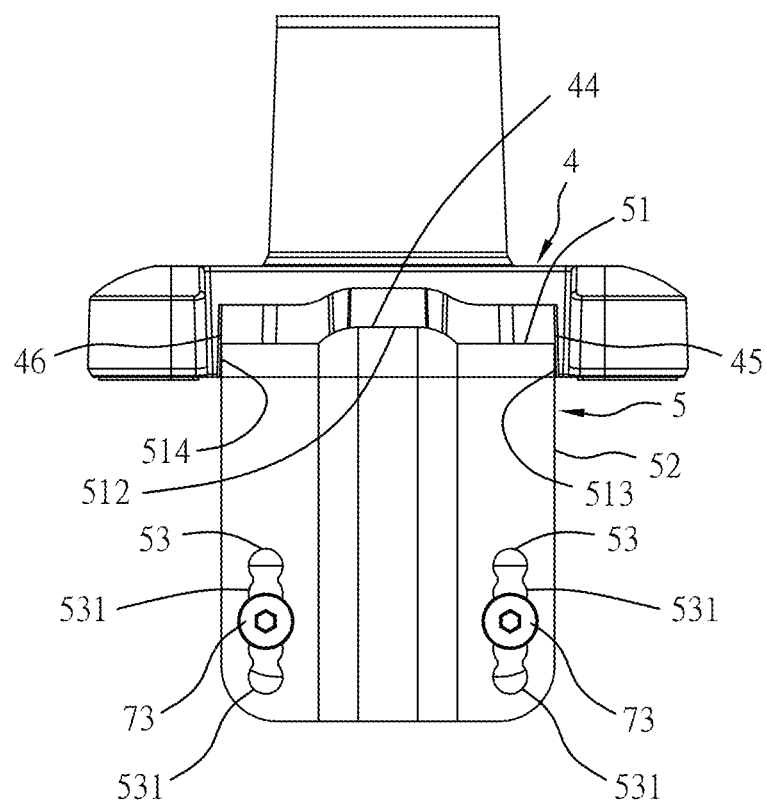
FIG. 6 is an enlarged side view of the present invention.
Figure 7:
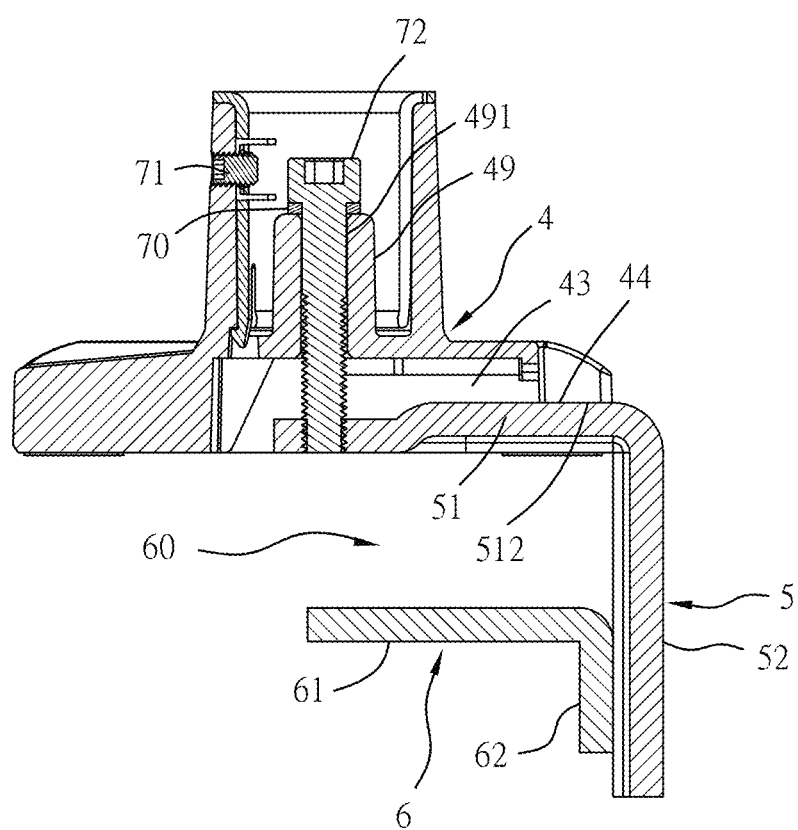
FIG. 7 is an enlarged schematic diagram of a partial assembly cross section of an embodiment of the present invention.
Figure 8:
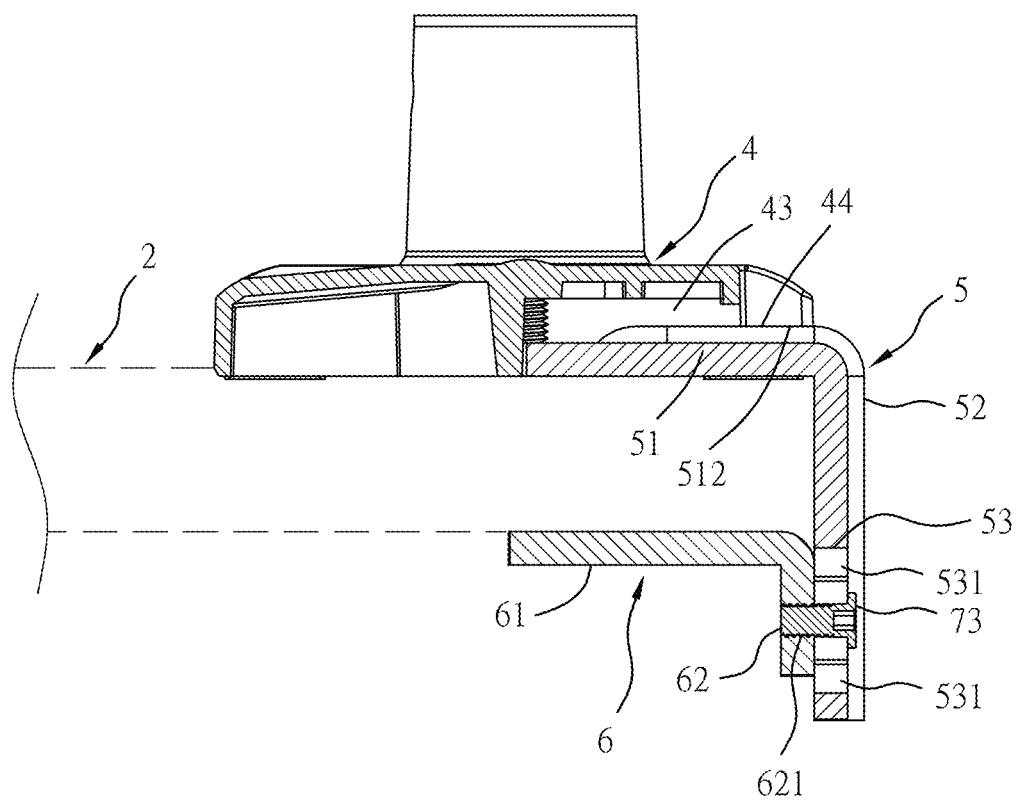
FIG. 8 is an enlarged schematic diagram of a partial cross-section of another angle of the present invention embodiment.

By means of the above-mentioned components, when the clips are to be mounted on the desktop 2, the screw threads of the two third locking elements 73 are first passed through the positioning holes 531 at the required heights according to the thickness of the desktop 2, and then connected and fixed with the connecting screw holes 621 of the second clip 6, so that a clipping space 60 can be formed (see FIG. 5 and FIG. 7). Then, the clipping space 60 can be used to clamp the clips on the desktop 2 (refer to FIG. 8), and then the screw thread of the second locking element 72 is locked with the fixing screw hole 511 of the first fixed wall 51 of the first clip 5 to connect and fix the first clip 5, so that the installation can be completed conveniently and quickly.

Figure 1:
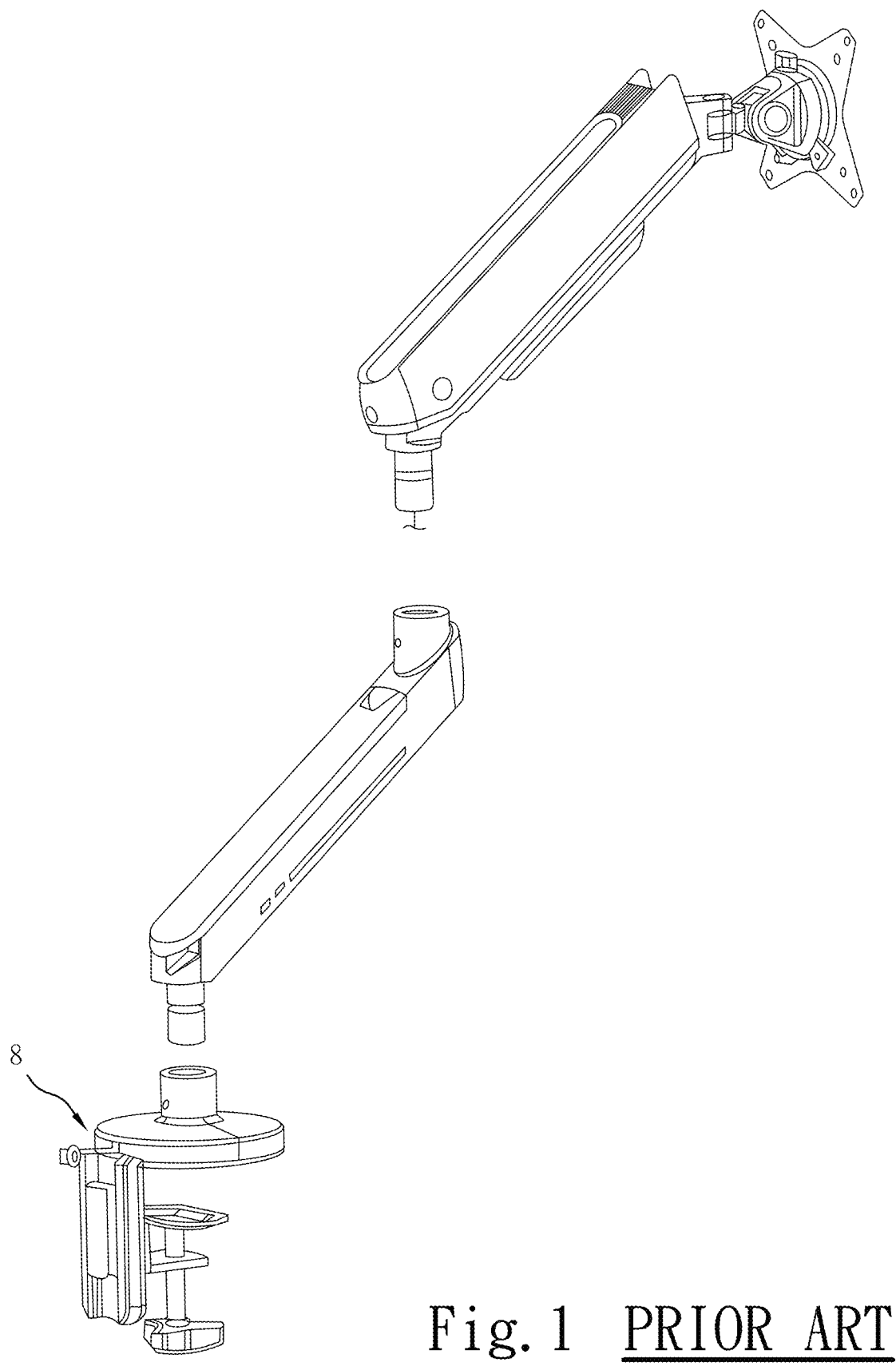
FIG. 1 is a three-dimensional exploded view of the base of a conventional monitor stand and the lower arm of the monitor stand.
Figure 2:
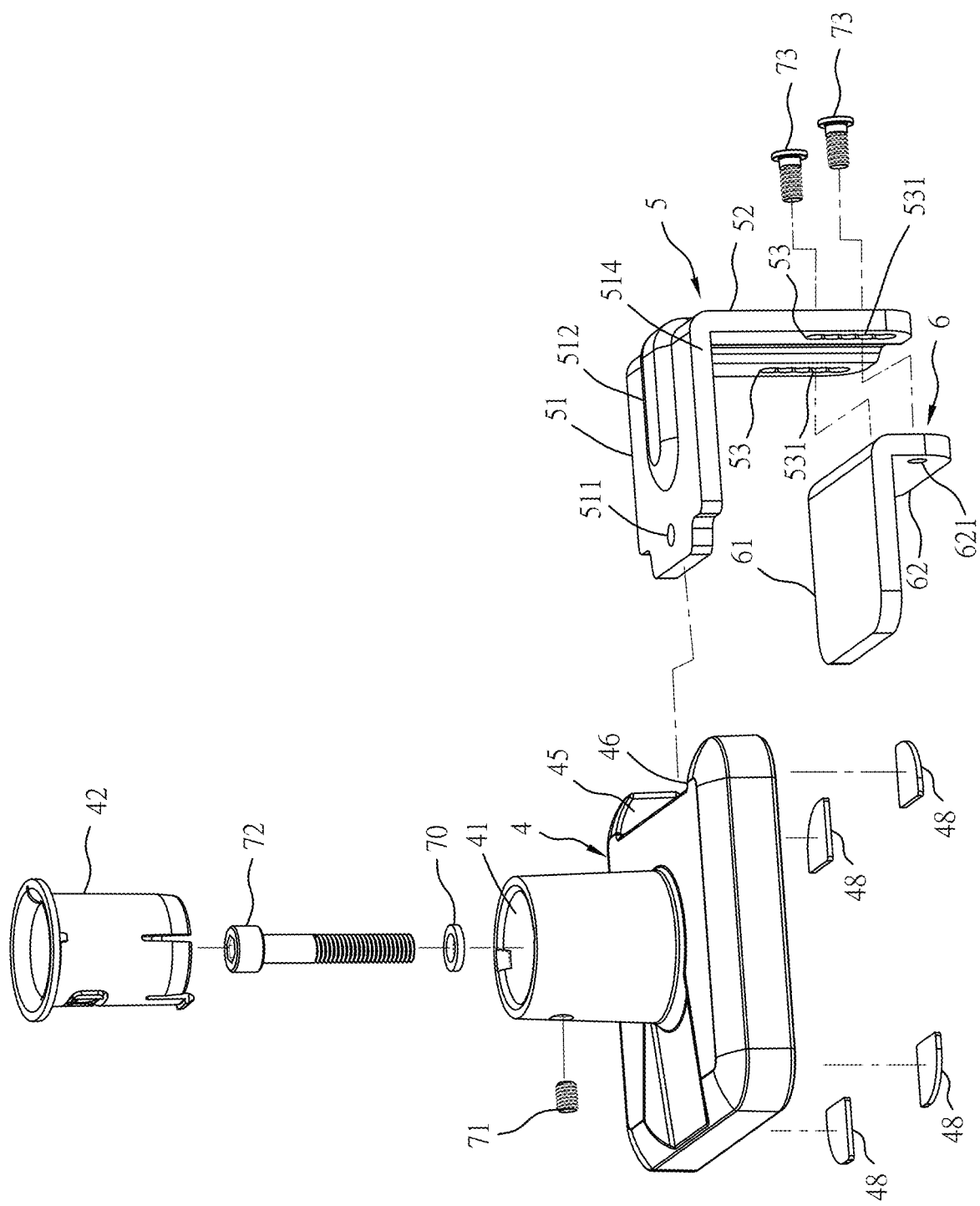
FIG. 2 is a three-dimensional exploded view of an embodiment of the present invention.
Figure 3:
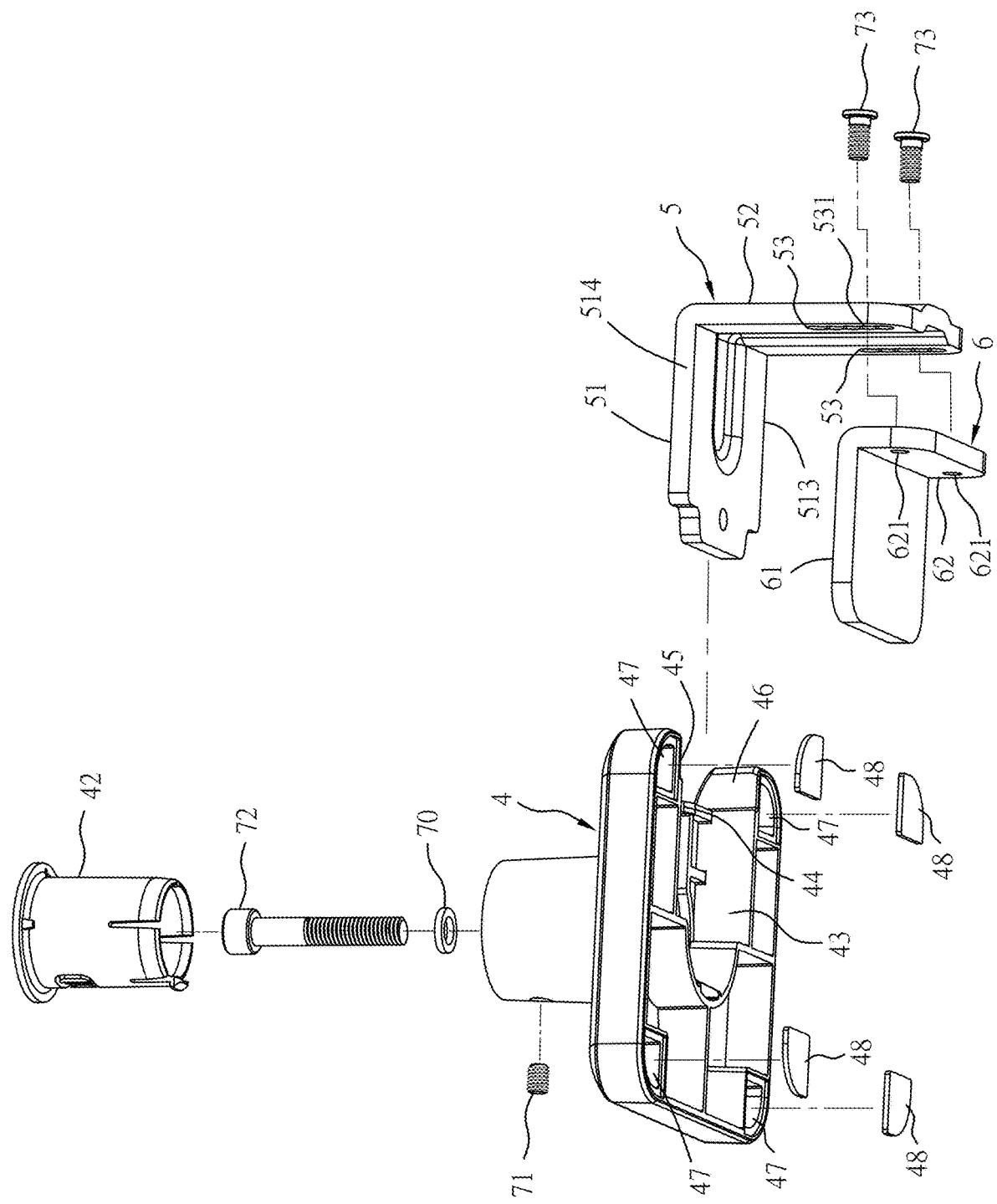
FIG. 3 is another perspective exploded view of the present invention.
Figure 4:
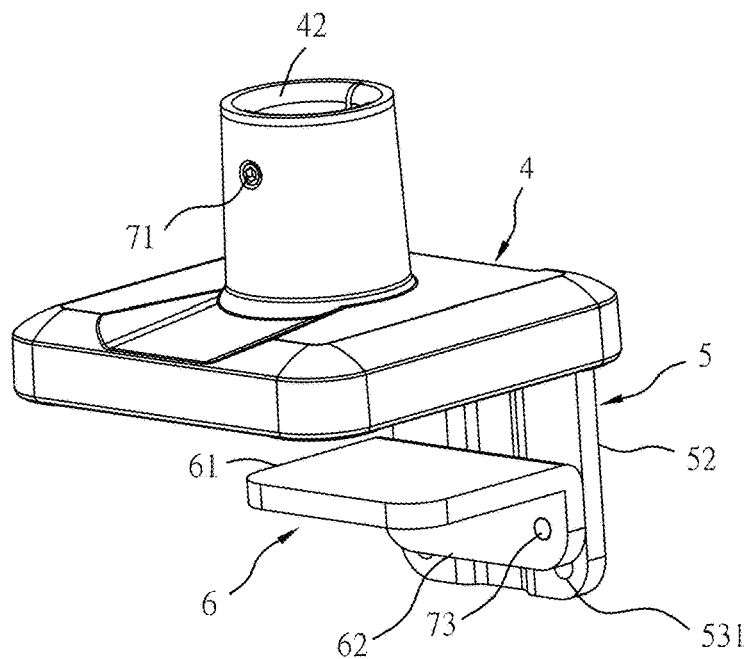
FIG. 4 is a three-dimensional diagram of the present invention.

Furthermore, the bottom of the base body 4 is further provided with a number of embedded grooves 47 (refer to FIG. 3) for arranging a corresponding number of elastic pads 48 (see FIG. 3). When the desktop 2 is sandwiched between the base body 4 and the first fixed wall 61 of the second clip 6, the stability can be improved.

Figure 10:
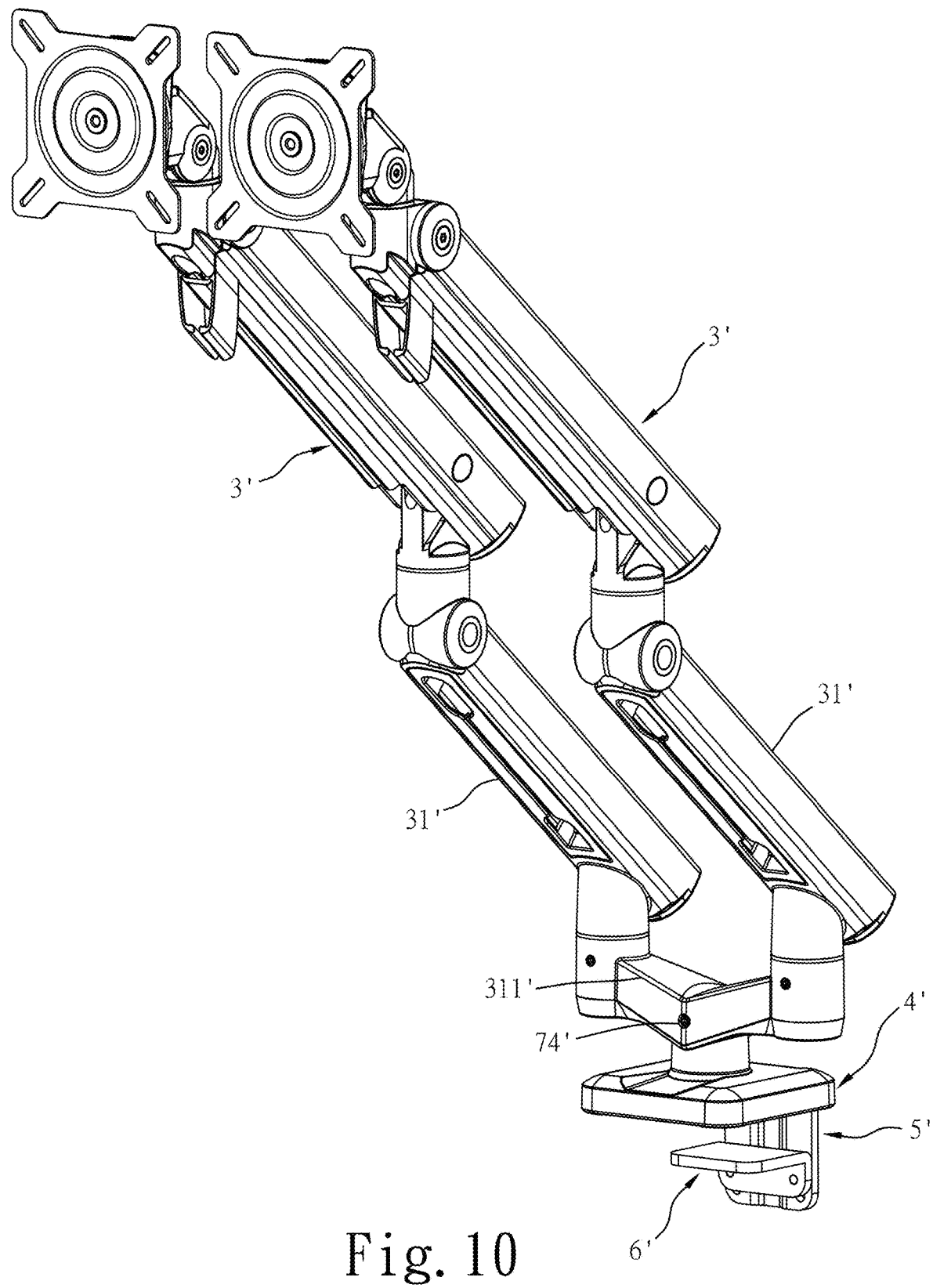
FIG. 10 is a three-dimensional schematic diagram of the present invention applied to a dual monitor bracket base structure and connected to the dual monitor bracket.

In addition, as shown in FIG. 10, the invention can also be applied to a dual monitor bracket monitor stand base structure, which comprises a base body 4', a first clip 5', a second clip 6' and other components. The upper portion thereof is connected to the lower joint portions 311' of the lower arms 31' of the two monitor brackets 3' through a fourth locking element 74'. Since the main structure is the same as the above-mentioned embodiment, it will not be described in detail.

In summary, the creation of this case can be summarized as having the following enhancement effects:

1. The installation operation is convenient and quick. The aforementioned clipping space 60 is used to clamp the desktop 2, and then the second locking element 72 is locked to complete the installation. When it is desired to readjust the clipping to another position on the desktop 2, the second locking element 72 can be disassembled and adjusted by simply loosening it.
2. The structure of the base body 4 and the first and second clips 5 and 6 is simple, and the threaded portion of the second locking element 72 passes through the base body 4 and is then locked with the fixing screw hole 511 of the first fixed wall 51 of the first clip 5 to connect and fix. At the same time, the upper end surface 512 of the first fixed wall 51 of the first clip 5 abuts against the upper abutting wall 44 of the receiving groove 43, and the front wall surface 513 and the rear wall surface 514 of the first fixed wall 51 of the first clip 5 abut against the front limiting wall 45 and the rear limiting wall 46 in the receiving groove 43, respectively, so that the base body 4 and the first clip 5 are stably connected, making the overall structure more stable, lightweight and space-saving.
3. Only three main components are needed, namely the base body 4, the first clip 5 and the second clip 6. Not only are the components simple and easy to assemble, but the cost is also relatively low.
4. Users can conveniently stand above the top of the desktop 2 to install or remove, without having to bend down to operate under the desktop 2.

What is claimed is:

1. A monitor stand base structure used to be clamped on a desktop with an upper portion thereof connected a monitor bracket, said monitor stand base structure comprising:

a base body comprising a setting groove on an upper side thereof, a sleeve provided in said setting groove and sleeved with a lower side of a lower arm of said monitor bracket through said sleeve, so that the lower arm of said monitor bracket is connected to said base body through a first locking element;

a first clip connected to said base body through a second locking element; and a second clip connected to said first clip through two third locking elements;

wherein:

said first clip comprises a first fixed wall, a first side wall connected to a lower side of an end edge of one side of said first fixed wall, a fixing screw hole located on an opposite side of said first fixed wall, two rows of positioning grooves located on said first side wall and a plurality of positioning holes of different heights located in each said positioning groove;

said second clip comprises a second fixed wall, a second side wall connected to a lower side of an end edge of one side of said second fixed wall and two connecting screw holes provided on said second side wall at intervals for allowing respective screw threads of said two third locking elements to be respectively passed through said two positioning holes at the same height of said first side wall of said first clip and then respectively connected with said two connecting screw holes of said second clip, so that said second clip is connected and fixed at the required height position of said first clip;

said base body further comprises a receiving groove provided at a bottom thereof, an upper abutment wall, a front limiting wall and a rear limiting wall located on an upper part of said receiving groove, a positioning column located therein and provided with a longitudinal through hole for a threaded portion of said second locking element to pass through so that a gasket is then passed through the said threaded portion of said second locking element and then locked with said fixing screw hole of said first fixed wall of said first clip to be connected and fixed, allowing an upper end surface of said first fixed wall of said first clip to abut against said upper abutting wall of said receiving groove and also allowing a front wall surface and a rear wall surface of said first fixed wall of said first clip to respectively abut against said front limiting wall and said rear limiting wall in said receiving groove, to further stably connect said base body to said first clip.

2. The monitor stand base structure as claimed in claim 1, wherein said base body further comprises a number of embedded grooves located on a bottom side thereof, and a corresponding number of elastic pads arranged in said embedded grooves respectively.

* * * * *